April 9, 1929.  G. HERBURGER, SR  1,708,416
POURING VESSEL
Filed Oct. 6, 1927
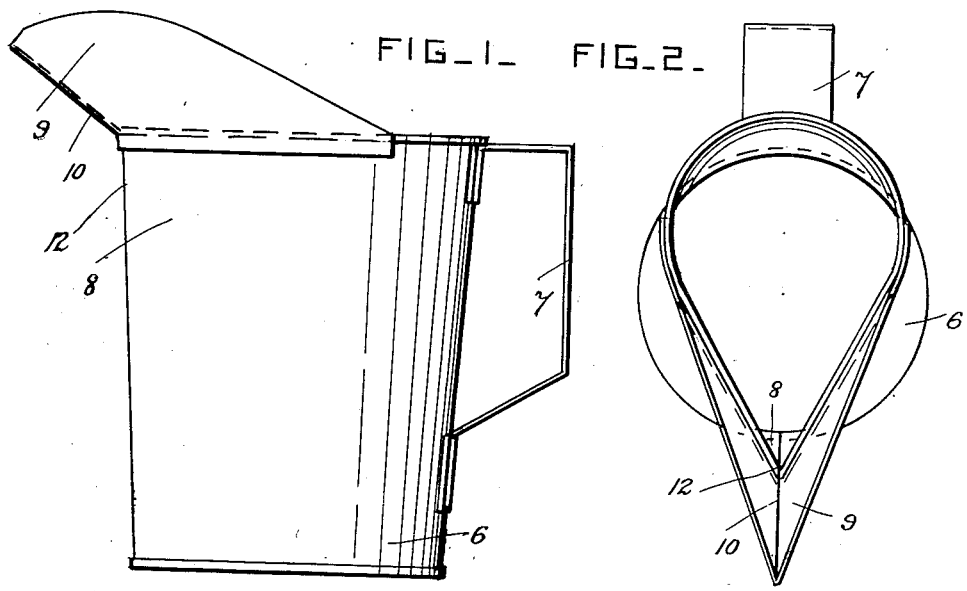
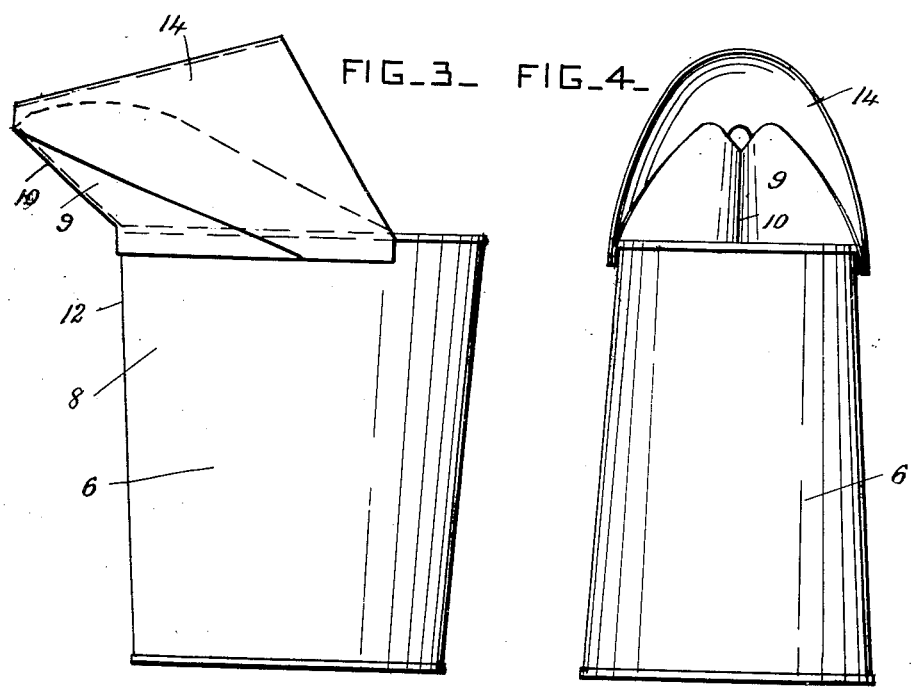

Patented Apr. 9, 1929.

1,708,416

UNITED STATES PATENT OFFICE.

GEORGE HERBURGER, SR., OF LINCOLN, ILLINOIS.

POURING VESSEL.

Application filed October 6, 1927. Serial No. 224,443.

This invention relates to pouring cups or vessels specially adapted for use in pouring liquids into bottles and other receptacles; and it consists of a pouring vessel provided with a lip or spout as hereinafter fully described and claimed.

In the drawings, Fig. 1 is a side view of a pouring vessel provided with a spout according to this invention. Fig. 2 is a plan view of the same. Fig. 3 is a side view of a pouring vessel having a differently formed spout. Fig. 4 is a rear view of the same.

The pouring vessel or cup 6 is formed of any approved material, and preferably of thin sheet metal, and has a handle 7, but this is not essential. The front side of the vessel is provided with a projecting V-shaped channel 8, deepest at its top and extending to its bottom. The bottom of the vessel is circular, and the rear part of its top is semi-circular. The vessel is formed by contracting the sides of a cylindrical can, so that the front and back of its top project over its bottom 6, as shown in Fig. 2, and so that the upper parts of its sides are not so wide as its bottom. This makes the top part of the vessel substantially pear-shaped in cross-section. A pouring spout 9 is secured to the sides of the top part of the channel, and is V-shaped in cross-section to conform to the cross-section of the channel, and its bottom 10 is arranged at an angle to the bottom 12 of the channel. The sides of the spout project above the top of the vessel, and their top edges are curved. The spout converges to a relatively sharp point, and enables the liquid contained in the vessel or cup to be poured into a bottle having a very small neck, without spilling any of the liquid. The vessel is also useful for many other purposes.

In the form of the device shown in Figs. 3 and 4, a hood 14 is secured to the top of the vessel over the spout 9, and this hood is conical so that it forms with the spout a funnel, which is convenient for some purposes. The hood and the spout may be formed integral with each other, of a single piece of sheet metal, if desired; or the hood can be secured over the spout, as shown, so as to stiffen and strengthen it.

When this pouring vessel is used, the use of a funnel in filling a bottle is dispensed with.

What I claim is:

A pouring vessel provided with a substantially circular bottom and having a top portion which is substantially pear-shaped in cross-section, the front and back of the top of the vessel being arranged to project over its bottom, the said back being substantially semi-circular and the said front being V-shaped in cross-section, and the sides of the vessel being narrower at the top than at the bottom, the said vessel being also provided with a pouring spout which is V-shaped in cross-section to conform to the cross-section of the front of the vessel.

In testimony whereof I have affixed my signature.

GEORGE HERBURGER, Sr.